No. 627,843. Patented June 27, 1899.
J. S. CONNELLY.
GAS REGULATOR.
(Application filed Nov. 6, 1897.)
(No Model.)

WITNESSES
Thomas W. Bakewell
Warren W. Swartz

INVENTOR
John S. Connelly

UNITED STATES PATENT OFFICE.

JOHN STORER CONNELLY, OF TITUSVILLE, PENNSYLVANIA, ASSIGNOR TO THE CONNELLY-CRITCHLOW COMPANY, OF SAME PLACE.

GAS-REGULATOR.

SPECIFICATION forming part of Letters Patent No. 627,843, dated June 27, 1899.

Application filed November 6, 1897. Serial No. 657,665. (No model.)

*To all whom it may concern:*

Be it known that I, JOHN STORER CONNELLY, of Titusville, in the county of Crawford and State of Pennsylvania, have invented a new and useful Improvement in Gas-Regulators, of which the following is a full, clear, and exact description, reference being had to the accompanying drawings, forming part of the specification, in which—

Figure 3:
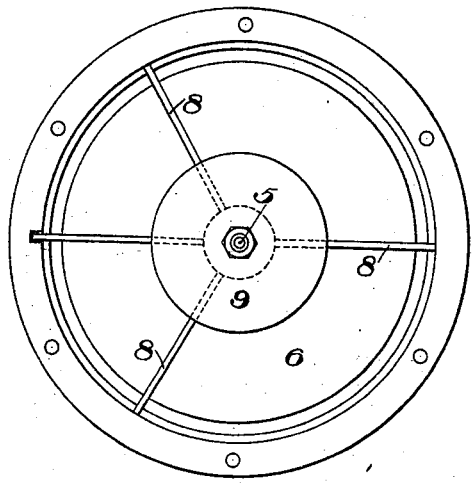
Figure 4:
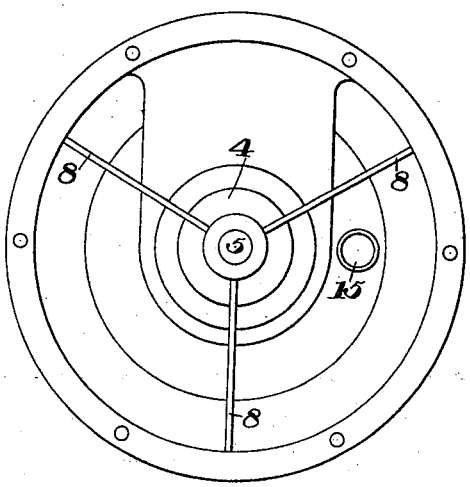
Figure 1:
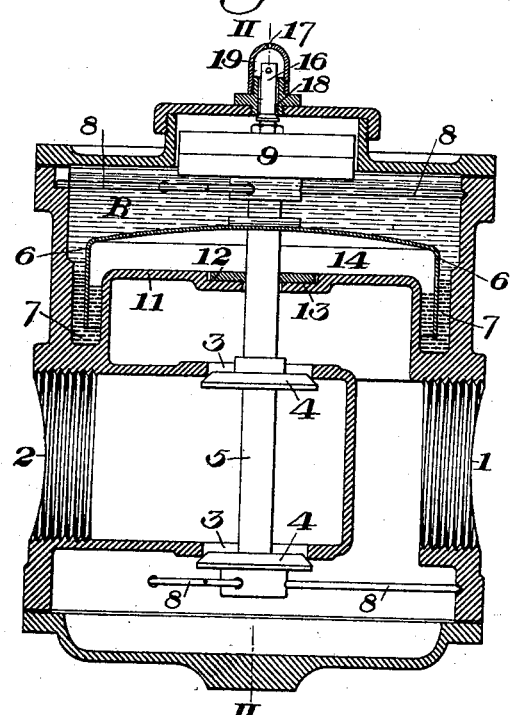
Figure 2:
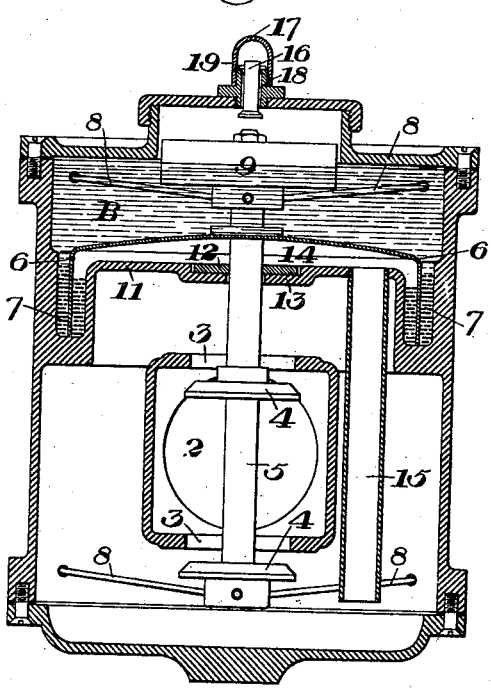

Figure 1 shows in vertical central section a gas-regulator constructed in accordance with my invention. Fig. 2 is a similar section on the line II II of Fig. 1, the section being taken at right angles to the plane of Fig. 1. Fig. 3 is a top plan view of Fig. 1 with the cover removed. Fig. 4 is a bottom plan view with the bottom cover removed.

In the drawings, 1 is the gas-outlet, and 2' the gas-inlet, of the regulator, the ports of which are provided with a balanced valve, though it is within the scope of my invention to use a single valve. This balanced valve comprises two disks 4 4, mounted on a single stem 5, which is fixed to a float or inverted cup 6, the edge of which dips in a body 7 of mercury. At the upper and lower ends the stem is supported and centralized by radial pins or rods 8, as described and claimed in my Patent No. 564,047, dated July 14, 1896. 9 is a weight set on the stem 5 and tending to force it downwardly.

The parts just described operate in the manner described in my former patent. The entrance of the gas through the port 2 (if the gas is of greater pressure than that for which the instrument is set by the weight 9) will raise the float 6, so as to throttle the ports 3 3 and to reduce properly the pressure of the gas passing from the outlet 1. If the pressure of the incoming gas should diminish at any time, the float will drop correspondingly, so as to widen the openings of the ports 3 3 and to preserve constant the pressure of the outgoing gas.

My improvements, which I am about to describe, are designed to enhance the efficiency of gas-regulators and to enable them to work accurately under all conditions.

One of the novel parts of my improvement consists in applying to the stem above the plate 11 under the float, through which plate the stem passes, a washer 12, through which the stem passes and which is mounted on the plate 11 or on a portion 13 thereof, so as to be capable of some loose lateral motion on the plate. The hole in the part 13 through which the stem passes is made of larger diameter than the stem, so as to permit free lateral play. This washer 12 has a double effect. By covering the hole in the plate through which the stem passes it serves as a shield against the jet of gas arising from said hole and prevents such jet from impinging upon the under side of the float and by its impetus from distorting the float's action under heavy pressures. This function is especially valuable in the use of natural gas or gas distributed at high pressure. Another important function which the washer performs is that of equalizing the action of the stem. The stem moves through the washer, and the washer can adjust itself laterally, and I thus avoid the necessity for causing the stem to bear against the part 13, and by enabling the rods 8 to perform the entire lateral supporting of the stem I prevent friction, and thus enhance the accuracy of the regulator.

The communication between the chamber 14 immediately under the float and the outlet-chamber of the regulator is afforded not by a simple opening, but by a pipe or passage 15, which extends down from the chamber 14 and the outer end of which is below and out of the path of the gas flowing from the upper port 3. This pipe therefore not only affords the desired communication between the chamber 14 and the outlet-chamber, but being out of the path of the gas from the port 3 it prevents the gas flowing in a jet into the chamber 14 and causing such accumulation of pressure under the float as would tend to impair the efficiency of the regulator by reducing below the normal the pressure of the gas in the service-pipes.

Another novel feature of the construction shown in the drawings consists in the use of an automatically-operated valve 16, controlling the passage to the air-vent hole 17, which is necessary to be provided in the regulator. This valve 16 when shut closes a port 18, which establishes communication between the vent and the chamber B above the float, and the valve is closed automatically by the valve-stem 5 when the float raises the latter sufficiently high to close the regulating-valves 4. If the pressure of gas should be increased abnormally when the valves in the service-pipe are closed, such gas might have a tendency after escaping past the valves 4 to bubble through the mercury under the edge of the float and to rise into the chamber above the float, escaping thence through the vent 17; but by the construction just described when the float is raised by such gas-pressure its stem will close the valve 18 and by thus shutting off the vent will prevent the leakage of gas which would otherwise result. Over the stem of the valve 16 I place a cap or chamber 19, in which the vent 17 is formed. I make said vent of less area than the passage around the valve-stem. The advantage of this is that if the gas should be turned suddenly into the inlet of the regulator, causing the float to rise quickly, the construction or throttling of the air-vent due to its smaller area will prevent the valve 18 from being blown shut prematurely by the upward pressure of air due to the rise of the float.

In the construction of my Patent No. 564,047 I use a body of mercury into which the circumference of the float dips; but above this body of mercury is a simple air-chamber. In my present construction I employ a body of oil, which I charge into the chamber B above the mercury and which extends up to or nearly to the top of the chamber, as shown in the drawings. This reduces the air-space above the float to a very small compass, and as a result I prevent the vibration or chattering of the parts of the regulator, which under high pressure on the inlet may otherwise take place, producing a constant and disagreeable humming noise.

Instead of the cup-shaped float shown in the drawings a diaphragm connected at its edges to the case or other equivalent apparatus may be used, and within the scope of my invention as defined in the claims changes may be made in the structure and relative arrangement of the parts.

I claim—

1. The combination of a regulating-valve and stem, a float or diaphragm, and a plate or washer surrounding the stem over the hole through which the stem passes, said stem fitting loosely in said hole, and said plate or washer being movable laterally on its seat; substantially as described.

2. The combination of a float or diaphragm, a chamber in which it moves, and a body of liquid contained within the chamber over the float or the diaphragm; substantially as described.

3. The combination of a float, a body of liquid in which it is immersed, and a supernatant body of liquid of less specific gravity over the float diminishing the air-space of the chamber in which the float moves; substantially as described.

4. The combination of a float or diaphragm, a regulating-valve controlled thereby, an air-vent from the chamber of the float or diaphragm, and a valve controlling the passage to said vent and adapted to be closed by action of the float or diaphragm; substantially as described.

5. The combination of a float or diaphragm, a regulating-valve controlled thereby, an air-vent from the chamber of the float or diaphragm, and a valve controlling the passage to said vent and adapted to be closed by action of the float or diaphragm, said vent being more restricted than the passage around the vent-controlling valve; substantially as described.

In testimony whereof I have hereunto set my hand.

JOHN STORER CONNELLY.

Witnesses:
THOMAS W. BAKEWELL,
GEORGE B. BLEMMING.